Sept. 3, 1968  M. J. GOODMAN  3,399,650
SELECTIVE BIRD FEEDER
Filed Aug. 9, 1966

INVENTOR
MARY J. GOODMAN

BY
Strauch, Nolan, Neale, Nies & Bronaugh
ATTORNEYS

з,399,650
SELECTIVE BIRD FEEDER
Mary J. Goodman, 861 Canal Drive,
McLean, Va. 22101
Filed Aug. 9, 1966, Ser. No. 571,289
17 Claims. (Cl. 119—51)

This invention relates to bird feeders, and is more particularly related to feeding devices for containing suet and the like for outdoor use, being especially constructed to permit feeding by some birds while excluding others.

Open or hopper-type bird feeders are available on the market but they present maintenance problems during various adverse weather conditions. During freezing weather, for example, snow and sleet can and will collect, forming a solid cover over the food or at the hopper access openings making the feed unavailable to the birds at times when they need it most. Another serious disadvantage common to those previously known feeders, is the fact that large, undesirable birds such as starlings and jays, clean out the feeders so fast that the desirable suet-eating birds such as woodpeckers, chicadees, nuthatches and tufted titmice do not get their share. Constant refilling is thus required. Often, animals such as dogs, cats, squirrels, possum, etc. remove suet, peanut butter or seed cakes from the feeders and can even carry away an entire hanging feeder which is not properly secured.

Food contamination, primarily caused by bird droppings which spread disease, often kills the birds and the ease with which such contamination can occur is another serious disadvantage of many presently available feeders.

Of course, feeders which dispense or offer bird food of the type for which this invention was conceived, even when overcoming the aforedescribed problems and disadvantages inherent in previously known feeders, must permit the food to be obtained by the desirable birds and should enable the contained food to be ventilated to minimize spoilage. To this end, the present invention utilizes an open mesh food confining feeder device, the sizes and locations of different areas of the food confining portion enabling access for the bills of different size birds and the construction of the feeder utilizing to advantage, knowledge of the perching, hanging and reaching characteristics of different species of birds to permit feeding by desirable birds yet prevent undesirable birds such as starlings and jays from reaching the larger mesh openings.

Accordingly a primary object of the present invention pertains to a novel bird feeder having a special construction to overcome the aforedescribed disadvantages.

Another object resides in the provision of a novel bird feeder constructed to assure that desirable birds get their share of food, yet will prevent undesirable birds and animals from emptying the feeder and will still provide food during all weather conditions. Commensurate with this object, a further object resides in so constructing the feeder to minimize chance of food contamination caused by bird droppings.

A still further object resides in the provision of an easily accessible novel suet or the like feeder having a confining overbody made of small mesh wire or a tough apertured plastic, having a combined base-guard portion of larger mesh, the small mesh apertures or interstices of the feeder overbody allowing only small birds to feed from a position above the guard while large and small birds, having the capability, must hang upside down under the guard portion to gain access to the food through the larger mesh apertures in the base.

Further objects reside in the adaptability of the basic feeder construction to various different shapes, and in connection with all feeder shapes a still further object resides in the provision of a solid plate secured over the feeder container to prevent contamination of food from above the container.

Further novel features and other objects of this invention will become apparent from the following detailed description, discussion and the appended claims taken in conjunction with the accompanying drawings showing a preferred structure and embodiment, in which:

Commensurate with the introductory portion of this description it is to be understood that the feeder of this invention is not a loose seed feeder, rather it is a container for materials of larger mass such as pieces of suet, globs of peanut butter, cakes made from seed and a binder and the like bird food.

Figure 1:
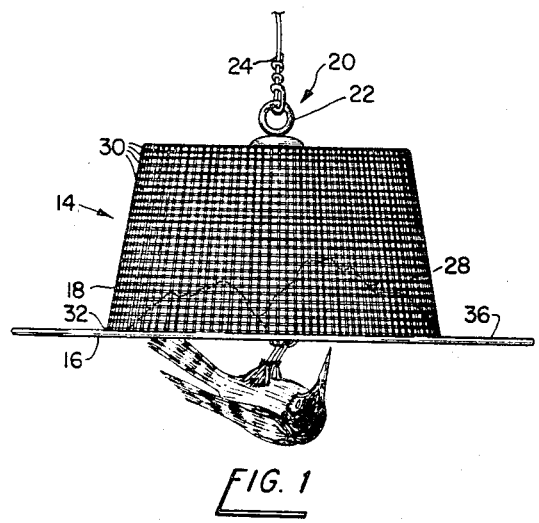
FIGURE 1 is a sketch made from a photograph of a bird feeder actually in use and made in accord with the present invention, a woodpecker hanging from the underneath side and feeding through the large base openings.
Figure 2:
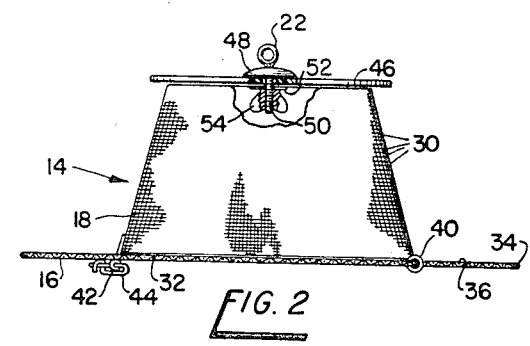
FIGURE 2 is a side elevation of a feeder substantially like that shown in FIGURE 1, portions being broken away to show the ring and pendant device used to hang the feeder.
Figure 3:
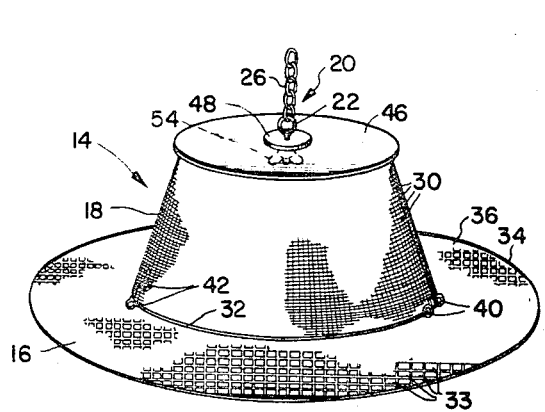
FIGURE 3 is a perspective view of the feeder shown in FIGURE 2.

As shown in FIGURES 1, 2 and 3, the feeder 14, consists of a flat bottom member 16, an inverted cup-like upper piece 18, which for convenience will be referred to as the container, and a hanger 20, the hanger consisting of a ring 22 affixed to the container and a wire 24 (FIGURE 1) or metal chain 26 (FIGURE 3) by which the feeder 14 is hung from a tree branch, an arm or a post or from a horizontal line. Refilling can be conveniently accomplished if the feeder is hung from a line looped around pulleys enabling the feeder to be pulled into a porch, for example, filled and then run out away from the porch.

In all of the illustrated embodiments of the feeder, the cup-shaped container is round but it could be made with a cross-section which is square, triangular or other shape as desired, the round shape, however, being preferred for manufacturing considerations. In any event, regardless of its shape, the container or overbody of the feeder will be that portion of the feeder which encircles and encloses the food 28 (FIGURE 1) which rests on the bottom member 16, and it will have small or fine mesh openings 30 whereas the bottom member will have large or coarse mesh openings 33.

Referring to the specific details of FIGURES 1, 2 and 3, the food container 18 is an inverted bowl or cup, frusto-conical in conguration, being slightly tapered and having a vertical dimension of approximately 4½″, the smaller diameter closed end of the container being uppermost. The large diameter open side of container 18 is preferably formed with a peripheral bead 32 which, in a wire mesh container, can be a metal ring secured by soldering, or other suitable means, to the mesh body. The bead 32 will lay flat against the bottom member 16 when the feeder is being used.

The bottom member 16 can be most simply cut from a piece of hardware cloth (a stiff metal wire square mesh screen) with ⅜″ or ½″ mesh openings 33. For appearance, elimination of sharp edges and added rigidity, a wire ring 34 may be fastened to the outer periphery of the bottom member by any suitable means such as soldering or twisting of the peripheral wire ends. If the bottom member is made from plastic, it can be cut from a heavy plastic screen or made by injection molding with an integral edge bead.

Bottom member 16 has several functions, it serves as a container bottom, a platform, a primary feeding area and a guard. The function of container bottom is obvious and it will be clearly understood that by making the bottom member with a larger diameter than that of the large diameter open side of container 18 and securing the container 18 coaxially or centrally on the bottom member 16, a flat peripheral ledge 36 will be provided around the bottom or peripheral bead 32 of the container. The food within container 18 will rest on the portion of bottom piece 16 which is defined by the area within container bottom bead 32 and, because it has the aforedescribed large mesh openings 33, enables feeding by large birds up from the underneath side of the feeder. That area is the primary feeding area.

The guard function of bottom member 16 is accomplished by a dimensional aspect of the platform or ledge 36. The distance which the platform 36 extends laterally outward from the large diameter or bead 32 of container 18 is predetermined so that the edge of the feeding platform terminates at a distance too great to allow feeding from the bottom or primary feeding area while the bird is standing on the feeding platform. It has been determined that a lateral ledge dimension of approximately 2½″ will prevent the large jays and also the smaller starlings from standing on the platform and bending under to feed at the primary feeding area. A narrower ledge will keep the starlings from feeding. In order to feed from the primary feeding area, the bird is forced by necessity to approach that area from the underside of the feeding platform in an inverted position. This feature inherently excludes large, undesirable birds, such as jays, starlings and others which cannot alight or hang in inverted position. The tapering of the sides of the container 18 places the walls somewhat closer to the food and will permit easier access for smaller birds, yet the fine mesh of the container prevents larger birds from feeding through the container walls. The feeder container 18 is intentionally constructed so that the openings 30 are limited in size to restrict the feeding of the undesirable birds. From practical experience, it has been found that mesh openings 30 when limited to a maximum dimension of approximately ⅛″, will prevent all large birds which include the voracious feeders from reaching the food from a position above the platform 36.

Figures 8, 9:
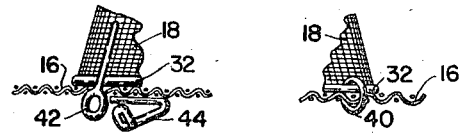
FIGURE 8 is an enlarged detail illustrating one way of hinging the container to the base.
FIGURE 9 illustrates a simple latch device which can be used for releasably securing the container in closed condition against the large diameter base piece.

In the exemplary feeder 14 illustrated in FIGURES 1, 2 and 3, the container 18 and the bottom piece 16 are made of two separable pieces which can be fastened together by a hinging arrangement and a suitable latch arrangement. Many such arrangements, such as hooks and eyes or the simple expedient of securing by twisting pieces of wire are well-known. A simple but effective fastening is illustrated in the drawing FIGURES 2, 3 and 8. Two loops 40 of stiff wire, spaced an inch or two apart, encircle the container bead 32 and one or two wires or mesh strands of the bottom piece to provide a hinge arrangement about which the container 18 can be swung up away from bottom piece 16 to permit loading with food. On the peripheral wall of container 18 opposite hinge loops 40 are one or more depending loops 42 which, in a metal feeder, can be made from wire soldered onto or twisted into the mesh wall strands of container 18. Each depending loop 42, when the container 18 is swung down against the bottom member 16, will project through a suitably shaped interstice in the mesh of the bottom piece and a suitable clip 44 (see FIGURE 9) can then be placed through the loop 42 to thereby latch the container and bottom piece in closed condition. The clip 44 can be a spiral ring or, as in FIGURE 9, can be shaped somewhat like a crude safety pin. Other simple devices such as a tapered wedge could be placed in the latch loop 42 to prevent its withdrawal and secure the feeder in closed condition.

The feeder body is desirably provided with a disc shaped protective, translucent top 46, which can be made from an inexpensive plastic sheet the purpose being to permit passage of light to the feeding area while preventing the food from being contaminated by foreign matter such as bird droppings falling into the feeding section from above.

The hanger ring 22 is conveniently formed as a pendant fastened on an axis which passes vertically through the center of the feeder. Ring 22 can be made integral with a flange 48 and a threaded stud 50 which projects through central apertures in disc 46 and the top of container 18. A washer 52 and wing nut 54 threaded on the stud 50 secure ring 22 rigidly to the feeder 14. The method of attaching is not necessarily restricted to the ring 22 as the device could be attached by other conventional methods provided the connection from wire or chain to the feeder terminates at a point on the center line axis and above the top of the feeder permitting the feeder to hang in a balanced condition.

The entire structure can be fabricated from any suitable type of readily available materials such as wire mesh or molded plastics having durable and weather resistant qualities and aesthetic appeal. The feeder must be made of material compatible with food and which will not generate any toxic condition. If made of plastic, it should be one of the tough plastics which resist fracture and tearing.

Figure 7:
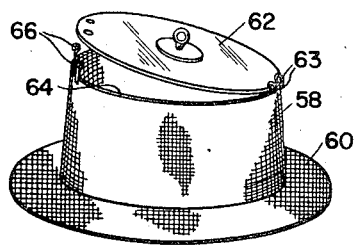
FIGURE 7 illustrates a modification with the top of the container being hinged rather than having the entire container hinged to the base.

As an alternative construction, shown in FIGURE 7, the container can be made with an annular side wall 58, rigidly and fixedly secured to a bottom member 60 by soldering or by twisting the ends of the container mesh around the strands of the bottom member. The top walls 62 in such a construction, can be the aforedescribed plastic disc and may be hinged by metal rings 63 to the upper periphery 64 of wall 58 which can be a metal ring similar to ring 32, and the top 62 can be latched by loops 66 and pins in a manner similar to that described in connection with the loops 42 and pins 44 in the first embodiment.

Figure 4:
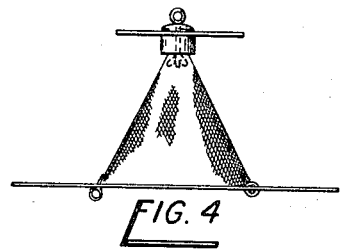
FIGURES 4, 5 and 6 are smaller scale schematic side views illustrating several different shapes suitable for the food container portion.
Figure 5:
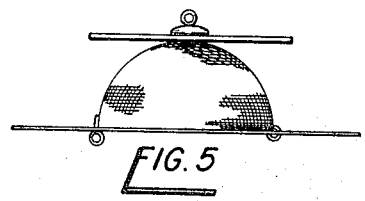
Figure 6:
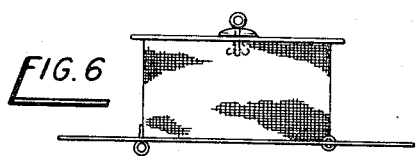

FIGURES 4, 5 and 6 illustrate several of the alternative shapes in which the container can be made, respectively, conical, hemispherical and cylindrical. In all cases the container walls above the bottom piece are made with the aforedescribed fine mesh, the bottom piece, particularly the area forming the bottom wall under the container, is made with the aforedescribed large mesh, and the platform should, as an optimum, extend at least approximately 2½″ outwardly from the base of the container. It has been found from actual experience in the area of Washington, D.C. that while a 2″ platform ledge will prevent many large undesirable birds from reaching under the ledge and feeding through the primary bottom feed area, the larger jays in some cases were able to reach under but an increase in the size to a 2½″ ledge prevented all jays from feeding. It is an interesting note that the larger birds will, upon initial installation of the feeder, try to reach the food but in a very short time give up and do not even return to annoy the desirable birds which can obtain the food.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A bird feeder for suet and the like food including a food confining portion having specific areas of different sizes of open mesh confining walls enabling access through mesh interstices for the bills of different size birds, and a guard means disposed between areas of small and large mesh openings dimensionally constructed to take cognizance of perching, hanging, alighting and reaching characteristics of different species of birds to prevent undesirable larger birds such as starlings and jays from reaching and feeding through said areas of larger openings wherein said food confining portion includes on inverted cup-like container made with fine mesh openings permitting access therethrough of the beaks of only small birds, and a bottom means providing a closure portion to the inverted opening of said container having openings of substantially larger mesh than said fine mesh openings, and including a peripheral portion extending laterally beyond the periphery of the opening of said inverted container to constitute said guard means.

2. A bird feeder as defined in claim 1 wherein a disc shaped cover, substantially as large as said inverted container opening, is secured in horizontal disposition to the top of said container.

3. A bird feeder as defined in claim 2 wherein said disc is made of plastic and permits passage of light.

4. A bird feeder as defined in claim 1 wherein the mesh size of said container is approximately ⅛".

5. A bird feeder as defined in claim 6 wherein the mesh size of said closure portion is at least ⅜".

6. A bird feeder as defined in claim 1 wherein the lateral distance between the periphery of said inverted container opening and the outer peripheral edge of said bottom means is approximately 2½".

7. A bird feeder as defined in claim 1 wherein a ring pendant device is centrally secured in the top of said container to enable a balanced hanging of said feeder.

8. A bird feeder as defined in claim 7, wherein a disc shaped cover substantially as large as said inverted container opening is secured in horizontal disposition over the top of said container by said ring pendant device.

9. A bird feeder as defined in claim 1 wherein said container is separable from said bottom means, means hinge said container to said bottom means, and releasable latch means are provided to rigidly secure said container against the upper surface of said bottom means yet permit hinged opening of said container for filling with food.

10. A bird feeder as defined in claim 1 wherein said container has a top wall piece separable from the container peripheral wall portion, means hinge said top wall piece to said peripheral wall portion and releasable latch means are provided on cooperating parts of said top wall piece and said peripheral wall portion to rigidly secure said top wall piece to said peripheral wall portion yet permit hinged opening of said top wall piece for filling the container with food.

11. A bird feeder as defined in claim 1 wherein said container is made with a frusto-conical shape and the small diameter is located at the top.

12. A bird feeder as defined in claim 1 wherein said container is made with a cylindrical shape.

13. A bird feeder as defined in claim 1 wherein said container is made with a semi-spherical shape.

14. A bird feeder as defined in claim 1 wherein said container is made with a conical shape.

15. A bird feeder as defined in claim 1 made from wire strands.

16. A bird feeder as defined in claim 1 made from molded plastic with webs and interstices providing said areas of said mesh openings.

17. A suet or the like feeder comprising: a food confining overbody made with small size apertures; a combined base-guard portion having larger size apertures extending laterally beyond the confines of said overbody; the small size apertures in said feeder overbody constituting means for allowing only small birds to feed above said base-guard while large and small birds, having the capability to hang upside down under the base guard portion may gain access to the food through the larger size apertures in the bottom.

References Cited
UNITED STATES PATENTS

| | | | |
|---|---|---|---|
| D. 85,404 | 10/1931 | Townley | D30—14 |
| D. 185,682 | 7/1959 | Sheffler | D30—14 |
| 1,092,314 | 4/1914 | White | 119—51 |
| 1,221,019 | 4/1917 | Bowdish | 119—51 |
| 1,253,002 | 1/1918 | Collins | 119—70 |
| 2,504,282 | 4/1950 | Tobias | 119—51 |
| 3,182,635 | 5/1965 | Waite | 119—51 |
| 3,273,537 | 9/1966 | Orr | 119—51 |
| 3,301,217 | 1/1967 | Prowinsky | 119—51 |
| 3,316,884 | 5/1967 | Viggars | 119—52 |

ALDRICH F. MEDBERY, *Primary Examiner.*

UNITED STATES PATENT OFFICE
CERTIFICATE OF CORRECTION

Patent No. 3,399,650                  September 3, 1968

Mary J. Goodman

It is certified that error appears in the above identified patent and that said Letters Patent are hereby corrected as shown below:

Column 5, line 26, the claim reference numeral "6" should read -- 4 --.

Signed and sealed this 20th day of January 1970.

(SEAL)
Attest:

Edward M. Fletcher, Jr.                  WILLIAM E. SCHUYLER, JR.
Attesting Officer                          Commissioner of Patents